(12) United States Patent
Singla

(10) Patent No.: US 8,719,772 B2
(45) Date of Patent: May 6, 2014

(54) PROGRAMMING LIBRARY USAGE CAPTURING AND REPRESENTATION

(75) Inventor: Kanwaljeet Singla, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 919 days.

(21) Appl. No.: 11/959,483

(22) Filed: Dec. 19, 2007

(65) Prior Publication Data

US 2009/0164983 A1    Jun. 25, 2009

(51) Int. Cl.
*G06F 9/44* (2006.01)

(52) U.S. Cl.
USPC ........... 717/106; 717/127; 717/128; 719/328; 719/330; 719/331

(58) Field of Classification Search
USPC .................................. 717/127, 124, 130, 151
See application file for complete search history.

(56) References Cited

U.S. PATENT DOCUMENTS

| | | | |
|---|---|---|---|
| 5,754,760 A | 5/1998 | Warfield | |
| 6,823,460 B1 | 11/2004 | Hollander et al. | |
| 7,003,781 B1 | 2/2006 | Blackwell et al. | |
| 7,047,446 B1* | 5/2006 | Maurer et al. | 714/38.1 |
| 7,231,210 B1 | 6/2007 | Croak et al. | |
| 7,770,068 B2* | 8/2010 | Drees | 714/38.14 |
| 7,958,497 B1* | 6/2011 | Lindo et al. | 717/128 |
| 2004/0260718 A1* | 12/2004 | Fedorov | 707/102 |
| 2005/0138646 A1 | 6/2005 | Mese et al. | |
| 2005/0187930 A1 | 8/2005 | Subramanian et al. | |
| 2006/0048136 A1 | 3/2006 | Vries et al. | |
| 2006/0075386 A1* | 4/2006 | Loh et al. | 717/124 |
| 2006/0092846 A1* | 5/2006 | Loh et al. | 370/241 |
| 2006/0136877 A1 | 6/2006 | Gdaniec et al. | |
| 2007/0083530 A1* | 4/2007 | Lakshminath et al. | 707/100 |

OTHER PUBLICATIONS

Paul McFedries, The Unauthorized Guide to Windows 98, Jun. 1999, Que, Second Edition, 137.*
Empower, Appendix 1, p. 5-1, Pure Software, Inc., Copyright 1995.*
Empower, Appendix 1, p. 5-4,Pure Software, Inc., Copyright 1995.*
Empower, Appendix 1, p. 5-5,Pure Software, Inc., Copyright 1995.*
Elliotte Rusty Harold & W. Scott Means, XML in a nutshell, O'Reilly Media Inc, 261-262.*
John Steven Pravir Bob Fleck Andy Podgurski, jRapture: A Capture/Replay Tool for Observation-Based Testing, 2000 intl. Symp. on Software testing and Analysis, Portland, Oregon, Aug. 2000, pp. 158-167).*

(Continued)

*Primary Examiner* — Lewis A Bullock, Jr.
*Assistant Examiner* — Hau H Hoang
(74) *Attorney, Agent, or Firm* — Ben Tabor; Kate Drakos; Micky Minhas

(57) ABSTRACT

A computer system may provide various resources to users through one or more programming libraries, such as application programming interfaces (APIs), in order to standardize access to such resources through various general-purpose mechanisms. These programming libraries may be operated by other programs, such as task-specific user interfaces, through which a user may utilize the programming library without having to understand its structure and functions. However, in many scenarios, a user may wish to know the manner of invoking a programming library to achieve an invoked behavior, or may wish to reproduce the behavior without having to utilize the user interface. A user may therefore capture an invocation of the programming library, and may generate an instruction set representing the captured invocation that may be studied, copied, modified, subsequently performed, etc.

19 Claims, 5 Drawing Sheets

(56) References Cited

OTHER PUBLICATIONS

John Steven, Pravir Chandra, Bob Fleck, Andy Podgurski, jRapture: A Capture/Replay Tool for Observation-Based Testing, 2000 Intl. Symp. on Software Testing and Analysis, Portland, Oregon, Aug. 2000, pp. 158-167.*

API monitor, http://web.archive.org/web/20060101003445/http://www.rohitab.com/apimonitor/[Jun. 6, 2013 2:14:43 PM].*

"API Monitor", http://www.rohitab.com/apimonitor/index.html.

"Web Server (IIS) Role", http://technet2.microsoft.com/WindowsServer2008/en/library/8f16760d-176a-4487-b165-5c4dcce871c41033.mspx.

Hunt, et al., "Detours: Binary Interception of Win32 Functions", Proceedings of the 3rd USENIX Windows NT Symposium, Date: 1999, pp. 1-9.

Steven, et al., "jRapture: A Capture/Replay Tool for Observation-Based Testing", Date: Aug. 2000, pp. 158-167.

* cited by examiner

PROGRAMMING LIBRARY USAGE CAPTURING AND REPRESENTATION

BACKGROUND

Modern computer systems are often configured to provide access to various resources, which may be exposed at a low level of operation (e.g., particular sector read and write operations for a hard disk drive.) In order to facilitate the use of such resources, a programming library may be provided with standardized, general-purpose operations that may be performed on a class of such resources (e.g., a memory management API may expose general memory management functions, such as allocation, deallocation, and compaction, which may be invoked upon a wide range of storage devices, such as system memory, memory caches, and hard disk drives.)

A general-purpose programming library may be overly complex for more complicated resources, such as webservers and printers, and it may be difficult for a user to determine an appropriate sequence of general-purpose operations to be performed through such programming libraries to achieve common tasks. Therefore, a user interface may be provided for performing common tasks on the resources through the invocation of the general-purpose programming interface. This structure may facilitate the administration of a resource through the designation of common tasks (through the user interface), each of which invokes various general-purpose operations (through the programming library), which in turn perform low-level operations on the resource.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The manipulation of a resource through a general-purpose programming library, which is in turn manipulated through a task-specific user interface, may facilitate and expedite the administration of the resource by an administrator. By using a user interface operably coupled to the resource through a programming library, an administrator may manage the resource according to some desired tasks, without having to learn or manipulate the low-level details of the resource or the general-purpose operations that may be performed through the programming interface.

However, in some scenarios, the administrator may wish to learn the operations performed on a programming library by various operations in a user interface. For example, an administrator may seek to perform a task on a variety of computer systems, and instead of performing the same task on many machines through a user interface, the administrator may prefer to automate the task performed through the user interface, such as through an interpretable script. Accordingly, the administrator may wish to capture the functional relationship between some task-specific operations provided by a user interface and the invocation of the programming library whereby the user interface fulfills the task.

Techniques may be devised in view of these interests for capturing and representing a programming library usage, such as through an interaction of a user with a user interface in the performance of a task. The usage may be captured and represented as an instruction set comprising the invocation of the programming library during the programming library usage. The instruction set may be stored in an executable format, e.g., an interpretable script or a source code in a programming language that may be compiled and executed. The instruction set may also be stored as a description of the programming library usage, and may be advantageously formatted, e.g., according to a hierarchical schema. The instruction set may therefore be used to reproduce the usage of the programming library, to study the nature of the interaction between the user interface and the programming library during the performance analysis of a task, etc.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
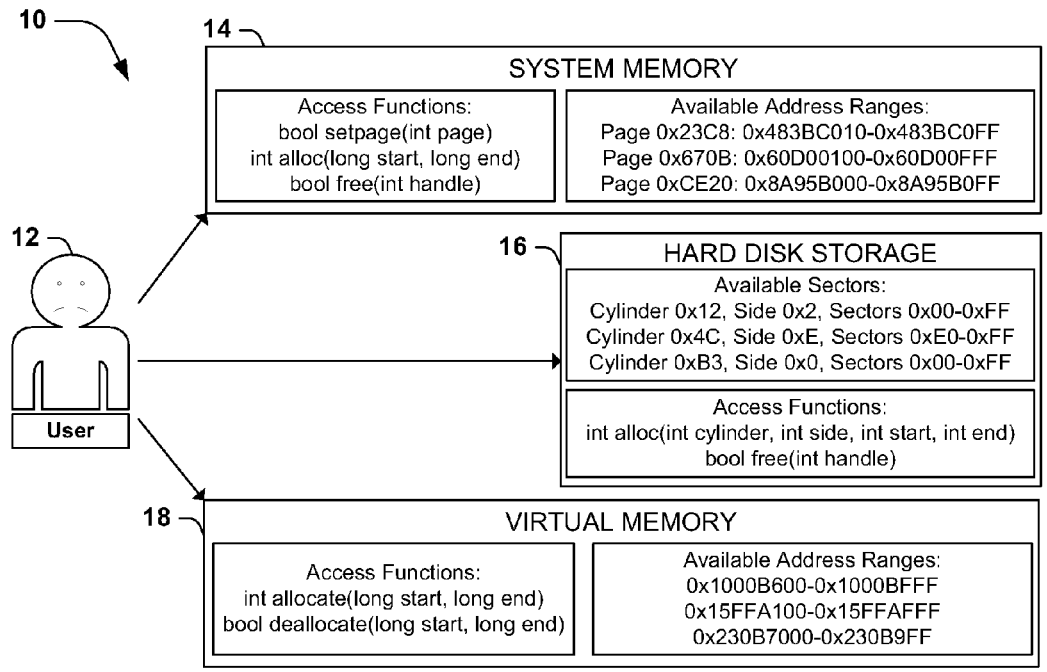
FIG. 1 is an exemplary interaction of a user with various memory resources in a computer system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Computer systems are capable of providing access to a broad number and variety of resources, such as system memory, multimedia devices, connected peripherals, data stores such as relational databases, event monitors and logs, etc. The utilization of such resources may involve detailed access mechanisms, and may involve complicated topics, such as shared access through synchronization objects, transactional interactions, and accessor protocols and objects.

In order to simplify and standardize such access, computer systems often expose such resources through a programming library, such as an application programming interface (API). A programming library of this type may endeavor to expose a resource to a user, such as a programmer, through a standardized set of objects and methods devised to provide standardized, general-purpose access to the resource while reducing the involvement of low-level details. The programming library may therefore provide a more practical interface to the resource, and may improve the reliability and efficiency of the computer system by normalizing the uses of various resources by various programs.

Figure 2:
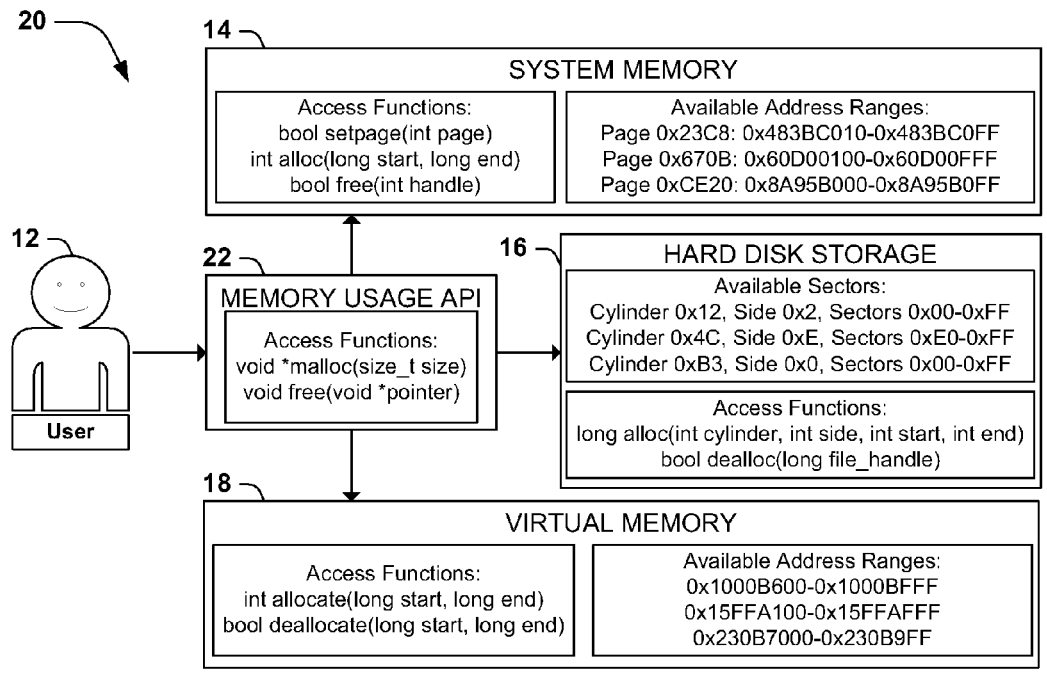
FIG. 2 is an exemplary interaction of a user with various memory resources in a computer system through a programming library comprising a memory usage API.

FIGS. 1-2 illustrate an example of a programming library that simplifies access to various resources. In the example 10 of FIG. 1, a user 12, such as a programmer, wishes to allocate a portion of memory, such as for a string or an object. However, the computer system provides low-level access to the various storage devices, such as system memory 14, hard disk storage 16, and virtual memory 18 (such as a swap file allocated as virtual memory on a hard disk drive), and memory allocation involves a request to allocate or free various portions of the storage devices according to the addressing mode of each device. The addressing mode of each device differs based on the type of device; in this example, the system memory 14 utilizes addressing based on a memory paging system, whereas the hard disk storage 16 utilizes addressing based on the hard disk structure, such as cylinders, sides, and sectors. Moreover, the access methods of each device differ, such that the user 12 may have to understand the low-level details of a particular device in order to allocate memory on the device. Such low-level access may be overly complicated for allocating memory, and the user 12 may not be interested in the location of the memory storage. By contrast, in the example 20 of FIG. 2, the computer system provides a memory usage API 22, comprising a programming library in the form of an application programming interface (API) for handling memory operations on the various storage devices, which exposes to the user 12 a simple set of procedures (in compliance with the C programming language standard.) The user 12 may simply request a block of memory of a specified size through the memory usage API 22, which handles the low-level details of interacting with the various memory devices and exposes a block of allocated memory to the user 12. More complex programming libraries for memory management might also expose or implicitly handle more complex functionalities, such as memory locking and sharing, garbage collection, and memory compaction.

Programming libraries, such as APIs, thereby facilitate user interaction with various computer system resources by abstracting some complex and uninteresting low-level details, and by providing standardized, general-purpose access to the resources. Users may interact with such programming libraries programmatically, i.e., through one or more instructions written by the user to be requested of the resources by a program. However, the general-purpose interface exposed by a programming library for a complex resource may still contain a large number of operations that can be used to achieve a wide assortment of tasks. A user who wishes to perform a particular task with a resource may therefore have difficulty selecting the operations from the general-purpose programming library that may be used to perform the task. This difficulty may be onerous if the task is typical or routine; for example, a particular task may involve many operations performed on the resource through the programming library, and a user may not wish to invoke all of these operations through the programming library for a routine or straightforward task that involves little input or configuration from the user.

Figure 3:
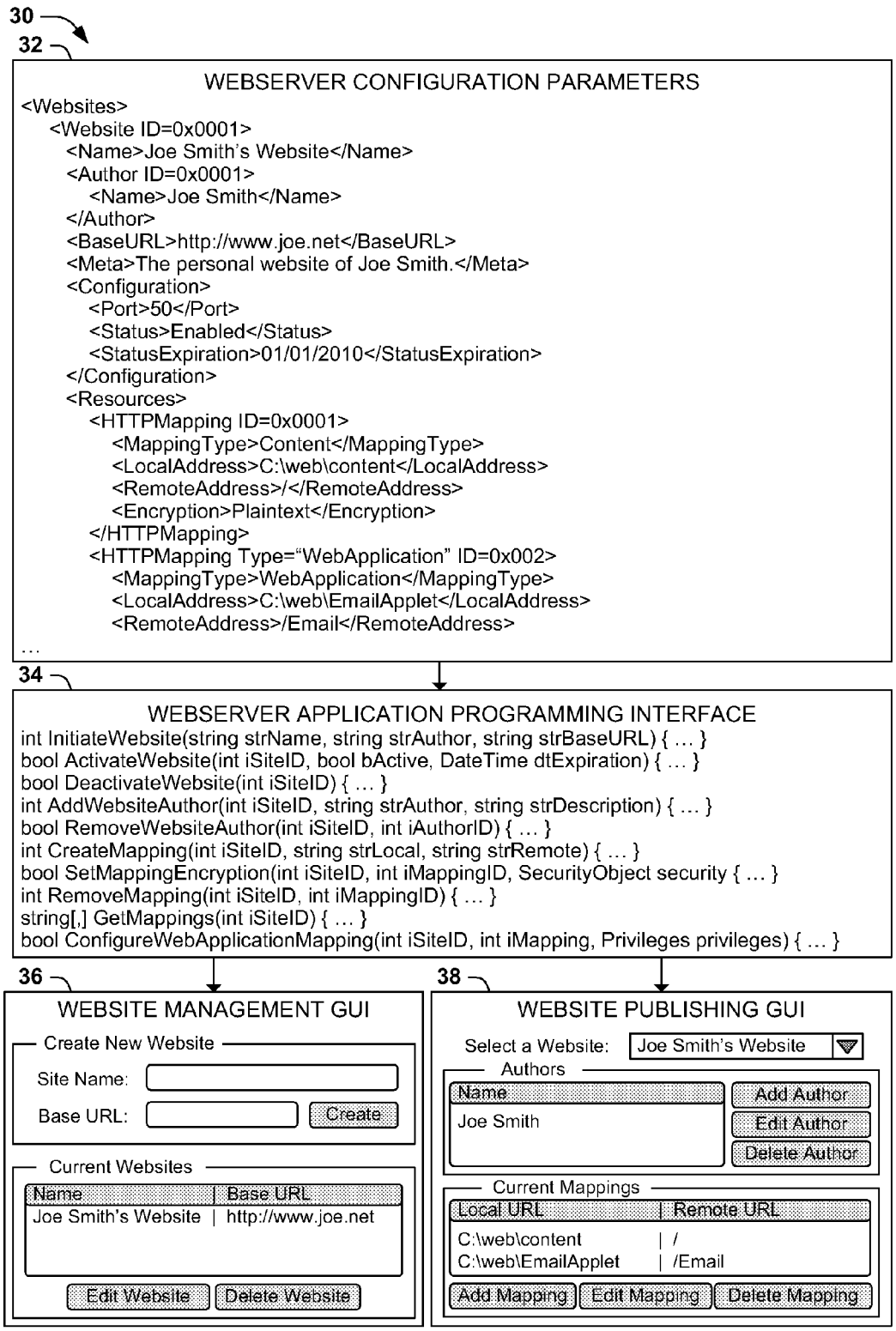
FIG. 3 is an illustration of a webserver configuration resource managed by a programming library operably coupled to two user interfaces.

In order to facilitate the performance of tasks on a resource through a general-purpose programming library, a user interface may be provided that invokes a programming library usage to achieve some common tasks. FIG. 3 presents an example 30 of a user interface configured to operate on a resource through a programming library. More specifically, this example 30 involves a webserver application having various webserver configuration properties 32 (presented in this example 30 as an XML file), which may be adjusted by invoking a programming library comprising a webserver API 34. Because the webserver API 34 includes a variety of general-purpose methods and operations, it may be difficult to determine the proper selection and sequence of operations for performing some routine tasks, such as creating a new website or updating the registered authors of the website. Rather, one or more user interfaces may be provided to facilitate the performance of various common tasks by adjusting the webserver configuration parameters 32 through the webserver API 34. The example 30 of FIG. 3 illustrates two such user interfaces: a first graphical user interface 36 for managing the websites provided by the webserver, and a second graphical user interface 38 for managing the publication of content on various websites.

For example, in order to create a new website through the system illustrated in the example 30 of FIG. 3, the webserver configuration parameters 32 may be adjusted to include a new XML section having hundreds of parameters, such as the name of the website, the registered authors, etc. Rather than adjusting the website configuration parameters 32 through manual editing, a website may be created by invoking a set of operations through the webserver API 34, e.g., InitiateWebsite( ) to create some initial parameters, AddWebsiteAuthor( ) to register one or more authors for the new website, CreateMapping( ) to create one or more local-to-remote web service mappings, SetMappingEncryption( ) to specify the encryption mechanism applied to each mapping, and ActivateWebsite( ) to turn on the web service for the new website. However, this set of general-purpose operations may still be overly complex for the simple task of creating a website. Therefore, a user may utilize the first graphical user interface 36 may be used to create a new website by entering the name and the base URL, and clicking the "Create" button. The first graphical user interface 36 may respond by invoking a suitable set of operations in the webserver API 34 for achieving the creation of the website, e.g., InitiateWebsite( ), CreateMapping( ), ActivateWebsite( ), etc.; and the webserver API 34 may fulfill each such invocation by appropriately adjusting the webserver configuration parameters 32 to perform the desired general-purpose operations. Similarly, tasks relating to the publication of content on a website may be achieved through the second graphical user interface 38, which exposes task-specific options and fulfills such tasks by invoking appropriate combinations of general-purpose operations of the webserver API 34. In this manner, task-oriented user interfaces, such as the first graphical user interface 36 and the second graphical user interface 38, may be provided to facilitate the management of computer system resources, such as the webserver application utilizing the webserver configuration parameters 32, through the invocation of operations in a programming library, such as the webserver API 34.

As illustrated in the examples of FIGS. 1-3, a user may conveniently interact with a resource through a user interface that is operably coupled to the resource through a programming library. One particular advantage of this configuration is that the user interface obscures the details of the interaction with the programming library, and opaquely performs various task-related operations on the programming library without involving the administrator in the details of the programming library. The user may therefore administer the resource without having to learn the low-level details of the resource, nor the details of the operations invoked in the programming library in the performance of the task that may not be of interest to the user.

However, in some scenarios, a user may be interested in the selection and sequence of operations invoked in the programming library to perform a task, such as those performed by a user interface in response to various task requests by the user. As one example, a task performed through a user interface may be failing for an unknown reason, and the administrator may wish to investigate the selection and sequence of operations invoked in the programming library by the user interface to determine the source of the failure. As a second example, an administrator may wish to perform a task that the user interface does not support, and may wish to understand how some related tasks are performed through the user interface in order to perform the desired task. As a third example, an administrator may be able to perform a desired task through a user interface, but may wish to automate the performance of the task by reproducing the selection and sequence of programming library operations invoked by the user interface for a particular task. This example may be useful, e.g., where a task is to be performed on many computer systems; rather than using the user interface to perform the task on each computer system, the administrator may wish to generate an instruction set, such as an interpretable script, that may be performed on various computer systems to accomplish the task. In these and other examples, the user may seek to capture a representation of the invocation of the programming library by the user interface in the performance of a task.

Other scenarios may also compel the user to capture such a representation of a programming library usage. As one example, a program may utilize a resource through a programming library, and the user may wish to study an interaction of a program with a resource through a programming library, e.g., to duplicate a resource usage by the program or to debug some problems in the interaction. As another example, a user may know that a program is accessing some resources through various programming libraries available on a computer system, but may be unable to identify the programming libraries so used or the usages thereof, and may therefore wish to capture any programming library usage by a program. Conversely, a user may know that a resource is being used by a program through a programming interface, but may be unable to determine which program is using the resource, and may therefore seek to capture a usage of a particular programming library by any program. As a third example, a user may directly interact with a programming library, e.g., in an experimental setting, and may wish to capture a representation of the interaction, e.g., in order to reproduce the interaction or to reverse changes performed during an experimental interaction.

According to these and other exemplary scenarios, techniques may be devised for recording and representing a programming library usage. The programming library usage may be captured during various usage scenarios (e.g., a usage of a particular programming library by a user interface or a program; a usage of any programming library by a particular program; etc.) The representation may be stored in many formats (e.g., an interpretable script, a source code in a programming language, and/or a partially or wholly compiled binary.) The representation may also be utilized in achieving various tasks with respect to the programming library (e.g., to illustrate the usage for analysis by a user, to reproduce a usage, and/or to inform the performance of a similar usage as specified by the user.)

Figure 4:
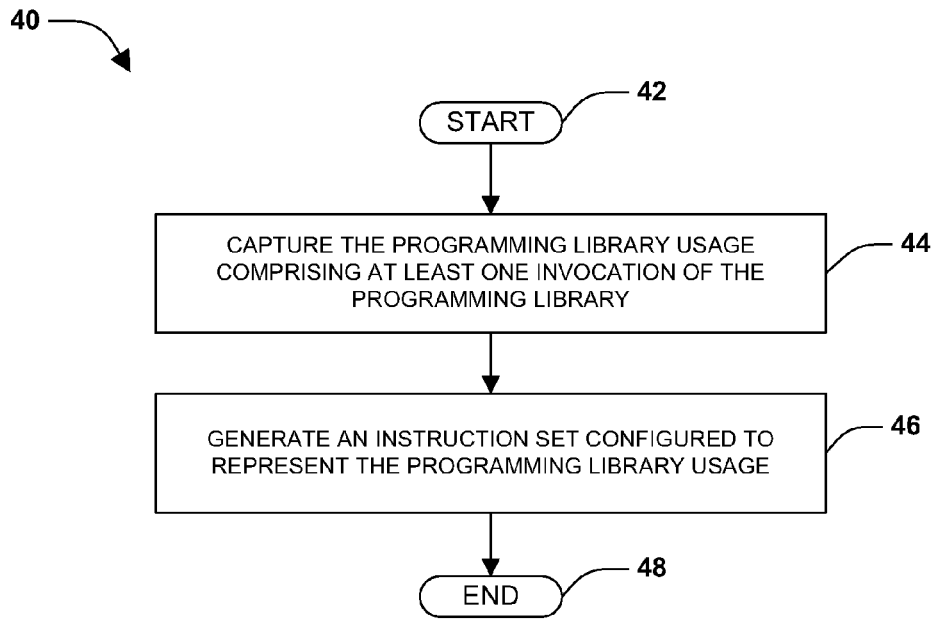
FIG. 4 is a flow diagram illustrating an exemplary method of representing a programming library usage.

FIG. 4 presents a flow diagram illustrating an exemplary method 40 of representing a programming library usage. The exemplary method 40 begins at 42 and involves capturing the programming library usage comprising at least one invocation of the programming library 44. The exemplary method 40 also involves generating an instruction set configured to represent the programming library usage 46. Having generated a representation of the programming library usage, the method 40 therefore ends at 48.

Figure 5:
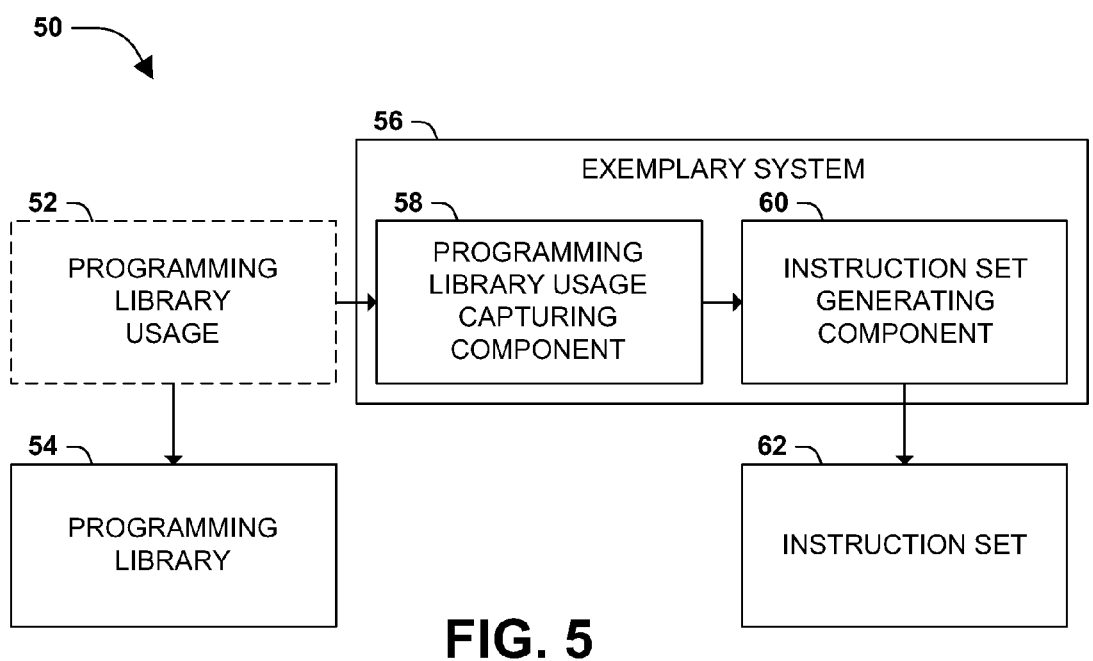
FIG. 5 is a component block diagram illustrating an exemplary system configured to represent a programming library usage.

FIG. 5 presents a component block diagram of an example 50 of a programming library usage and a system 56 configured to produce a representation thereof. This example 50 involves a programming library usage 52, which may be generated (e.g.) by a user interface operated by a user, by a program configured to utilize the programming library 54, and/or by a direct usage of the programming library 54 by the user. The exemplary system 56 comprises a programming library usage capturing component 58, which captures a representation of the programming library usage 52. The exemplary system 56 also comprises an instruction set generating component 60, which generates an instruction set 62 representing the programming library usage 52. The exemplary system 56 thereby produces a representation of the programming library usage 52 that may be later used for various ends.

Figure 6:
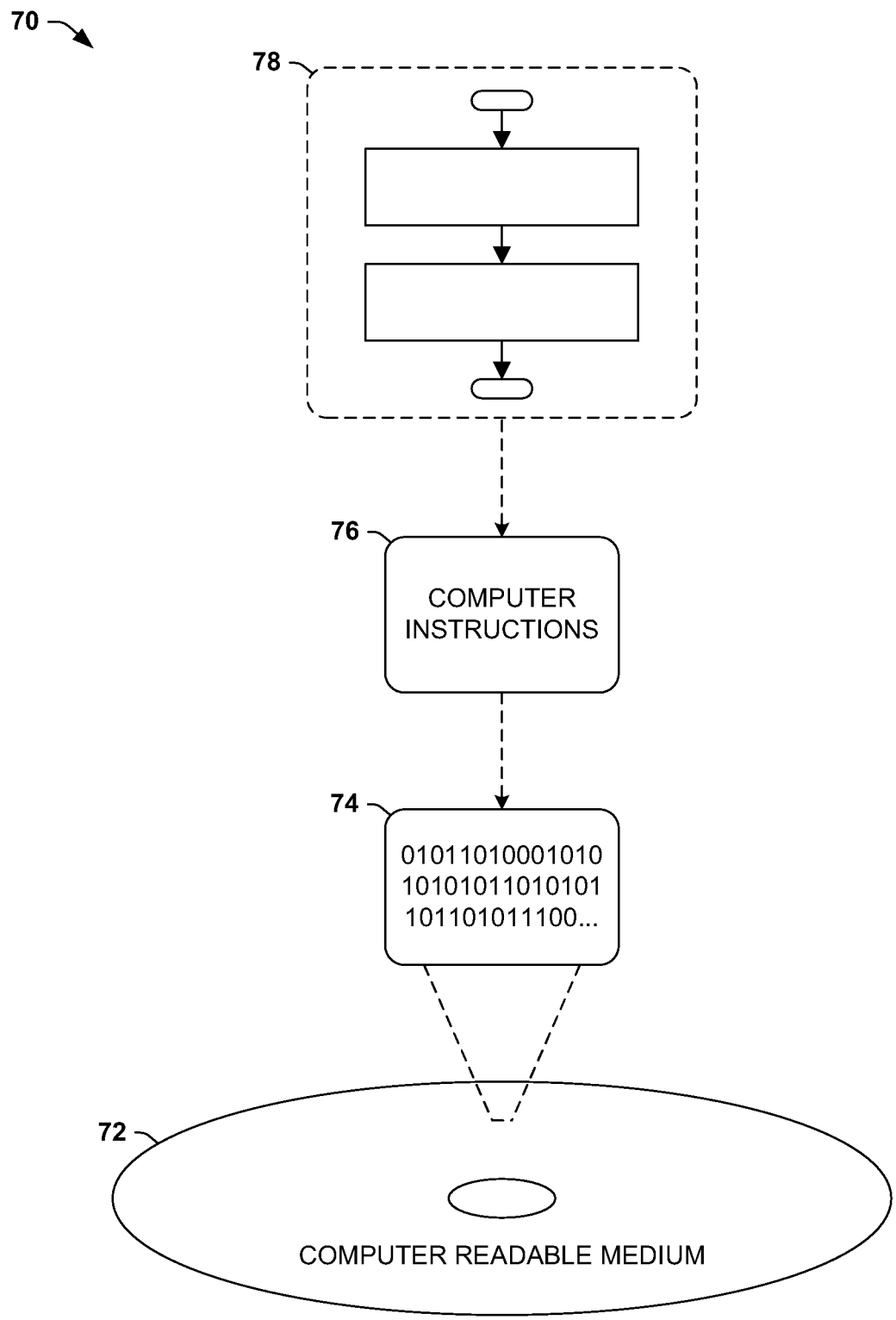
FIG. 6 is an illustration of an exemplary computer-readable medium comprising processor-executable instructions configured to embody the techniques disclosed herein.

Still another embodiment involves a computer-readable medium comprising processor-executable instructions configured to apply the techniques presented herein. An exemplary computer-readable medium that may be devised in these ways is illustrated in FIG. 6, wherein the implementation 70 comprises a computer-readable medium 72 (e.g., a CD-R, DVD-R, a platter of a hard disk drive, and/or a non-volatile solid-state memory, such as a flash RAM device), on which is encoded computer-readable data 74. This computer-readable data 74 in turn comprises a set of computer instructions 76 configured to operate according to the principles set forth herein. In one such embodiment 70, the processor-executable instructions 76 may be configured to perform a method of representing a programming library usage, such as the exemplary method 40 of FIG. 4. In another such embodiment, the processor-executable instructions 76 may be configured to implement a system configured to represent a programming library usage, such as the exemplary system 56 of FIG. 5. Many such computer-readable media may be devised by those of ordinary skill in the art that are configured to operate in accordance with the techniques presented herein.

The techniques discussed herein (including the exemplary method 40 of FIG. 4, the exemplary system 56 of FIG. 5, and the exemplary computer-readable medium 70 of FIG. 6) may be implemented in many ways. Some aspects of these implementations may vary so as to present additional advantages and/or to reduce disadvantages with respect to other variations of these and other techniques. These aspect variations may be included, and in some cases combined, to produce embodiments having various sets of features that may be of value in particular scenarios.

A first aspect that may vary among implementations of the techniques presented herein relates to the specification of the programming library usage to be captured. Many computer systems provide a wide number and variety of programming libraries for various purposes and tasks, and these programming libraries may be concurrently utilized by a large number of running processes to achieve various ends. In some scenarios, it may be advantageous to capture all capturable programming library usages, e.g., where an effect is arising in the computer system that may be attributable to an invocation of an unknown programming library by an unknown calling program. However, in many scenarios, capturing all programming library usages may provide too much information in the resulting instruction set, and performing the instruction set may have undesirable side-effects caused by the inclusion of unrelated programming library usages that happened to coincide with the performance of the programming library usages of interest.

Figure 7:
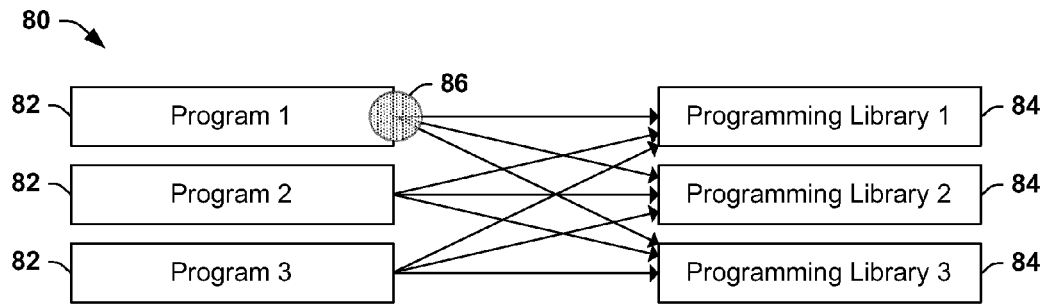
FIG. 7 is an illustration of an exemplary interaction of programs among programming libraries.
Figure 8:
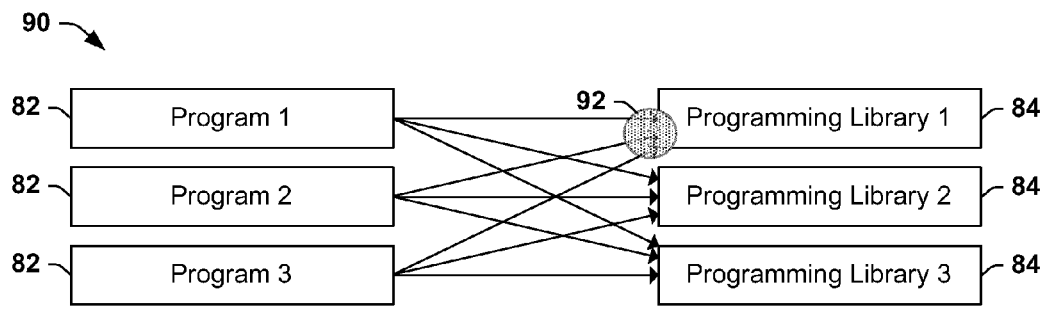
FIG. 8 is an illustration of an exemplary interaction of programs among programming libraries.
Figure 9:
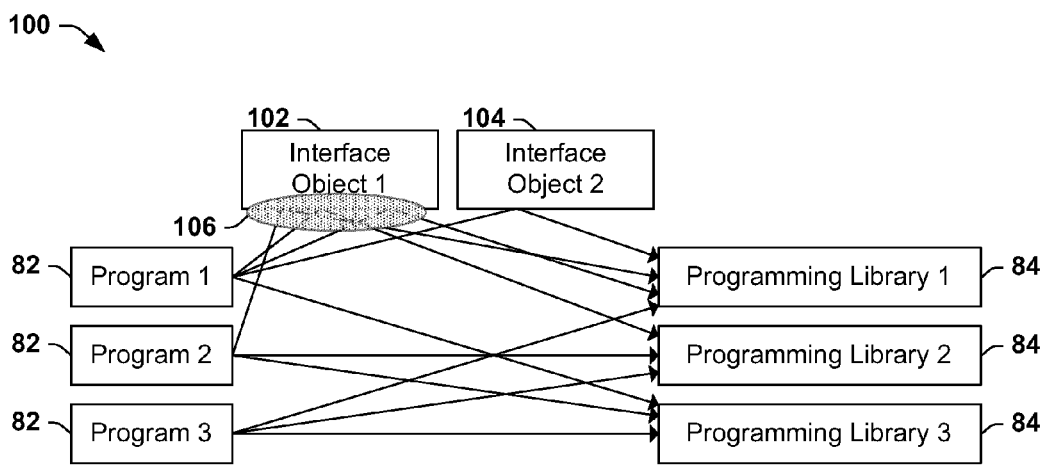
FIG. 9 is an illustration of an exemplary interaction of programs among programming libraries.

Accordingly, it may be more desirable to capture a subset of programming library usages. FIGS. 7-9 illustrate a few scenarios for specifying the subset of usages to be captured. Each of the examples 80, 90, 100 of FIGS. 7-9 illustrates a computer system having three running programs 82 that are utilizing three programming libraries 84. In the example 80 of FIG. 7, the targeted subset 86 of programming library usages comprises the programming library usages generated by a particular program. A capturing system (such as the exemplary system 56 of FIG. 5) may therefore be configured to capture any programming library usages invoked by the program of interest. As one example, the program of interest may comprise a user interface operated by a user, which may be useful in the scenario where the user wishes to perform a task through a user interface and to capture a representation of the programming library usages invoked by the user interface in the performance of the task. The user interface in this example may comprise, e.g., a graphical user interface that interacts with the user through a set of graphical controls, such as buttons, textboxes, lists, and sliders, for manipulating a resource through a programming interface. Alternatively or additionally, the user interface in this example may comprise, e.g., a command-line interface that interacts with the user through a command prompt, wherein the user may provide text input comprising one or more instructions to be parsed and performed by the command-line interface. Many other user interfaces may be compatible with this technique (e.g., menu-based, voice-activated, and/or natural-language user interfaces.) In these examples, the capturing system may be configured to monitor the usage of various programming libraries invoked by the user interface, and may generate an instruction set representing the usages of the programming libraries by the user through the user interface, while excluding usages of the programming libraries by other programs. The programs targeted by this technique may be specified in many ways (e.g., by selecting from a set of running processes; by specifying processes belonging to a particular application, such as a particular executable binary; or by specifying processes running under a certain context, such as through a particular user account in a multi-user computer system.) The targeting might also specify particular portions of a program, e.g., only programming library usages generated by one or more particular threads running within a process. Those of ordinary skill in the art may be able to devise many techniques for targeting various programming usages by a particular subset of programs in accordance with the techniques discussed herein.

Conversely, in the example 90 of FIG. 8, the capturing system is configured to focus on a targeted subset 92 of usages of one or more specified programming libraries by various programs. The instruction set provided may therefore be limited to one or more programming libraries of interest, and may exclude usages of other programming libraries that are not germane to the subject of inquiry. This technique may be useful in many scenarios, such as (e.g.) where a programming library is being used by several cooperating applications; where the programming library is to be examined under concurrent usage, such as in a load test; and where an invocation of a programming library is arising from an unknown source. The programming libraries may also be targeted in many ways, e.g., by specifying particular programming libraries by filename or process name, those of a particular type (e.g., device driver programming libraries) or those belonging to a particular group (e.g., programming libraries belonging to a multimedia rendering library), etc. Additionally, in one set of embodiments of this aspect variation, the targeted programming libraries may be specified according to one or more programming library version numbers. This technique may be useful where multiple versions of a programming library are available (e.g., within a global assembly cache), and usages of a particular set of versions are of interest. Many variations may be devised to embody this specification technique; e.g., the capturing system may target the versions of a particular programming library between versions 1.2 through 1.4, or any version that is backwards-compatible with version 1.2, etc. Many techniques may be devised for targeting particular versions of various programming libraries for capturing programming library usages in accordance with the techniques discussed herein. Additionally, this aspect variation may be combined with the specification of programming library usages by a specified set of programs, e.g., to capture only the usages of programming library (x) by program (y).

FIG. 9 illustrates a third example 100 of this aspect variation, in which some programming libraries are accessed through one or more interface objects. In this scenario, an interface class is declared to serve as a proxy between a program and a programming library used by the program. Instances of the interface class may therefore be created on an ad hoc basis, i.e., to mediate a particular task among one or more programs and one or more programming libraries. This scenario may be useful where, e.g., the interaction with the programming library is more complicated than a per-use, synchronous method invocation, such as where the invocations of the programming library are significantly stateful, or where some usages involve some asynchronous callback handling that may be provided by the proxy. Programming libraries that are often structured in this manner include generalized software component systems, such as the Component Object Model (COM), the Common Object Request Broker Architecture® (CORBA), and JavaBeans™ platforms. Accordingly, a capturing system may be directed to target the programming library usages generated by one or more programs through one or more particular programming library interface objects. The example 100 of FIG. 9 illustrates one such scenario involving a first interface object 102 and a second interface object 104, each of which may be accessing various programming libraries 84 on behalf of various programs 82. In this example, the capturing system focuses on a targeted subset 106 comprising the usages of the programming libraries 84 by various programs 82 through the first interface object 102. This aspect variation may also be combined with other aspect variations, e.g., to capture only the invocations of a specified subset of programming libraries 84 by one or more specified interface objects, and/or to capture only the invocations of programming libraries 84 by one or more specified interface objects on behalf of one or more specified programs 82. Those of ordinary skill in the art may be able to devise other techniques for targeting programming library invocations through programming library interface objects in accordance with the techniques provided herein.

A second aspect that may vary among implementations of the techniques presented herein relates to the manner of capturing the specified programming library usage. In order to capture the programming library usages specified according to the first aspect, a capturing system may devise many techniques for detecting, analyzing, and detailing the targeted programming library usages for capturing the desired representation. As one example, if a programming library is invoked through a hardware or software interrupt, the capturing system may hook the interrupt with a detection function that records the invocation before propagating the interrupt to the programming library invocation. As a second example, one or more methods of a programming library targeted for capturing may be diverted to a similar detection function that records the invocation before invoking the programming library function. A broader version of this example involves substituting an entire programming library with a proxy configured to record various invocations of the programming library before propagating the invocations to the monitored programming library. As a third example, a runtime or virtual machine within which a program is executing may be configured to trap instructions comprising calls to a programming library, and to record the invocation before fulfilling the invocation. As a fourth example, an instruction point monitor may be configured to detect an entry of an invoked function of the programming library, and to record the invocation of the programming library. Those of ordinary skill in the art may be capable of devising many such detection techniques while implementing the techniques discussed herein.

A third aspect that may vary among implementations of the techniques presented herein relates to the information included in the captured programming library invocations. In furtherance of representing the usage as an instruction set, the captured representation may include the programming libraries invoked and the method thereof. The representation may also include an identification of a program that invoked the usage of the programming library, and/or a thread within the program that invoked the usage of the programming library. For programming libraries coupled with programming library interface objects, such as software component architectures, the representation may also include an identification of a programming library interface object through which the invocation was made. The representation may also include an identification of any parameters that were provided to an invoked programming method, which may include (e.g.) simple types such as numbers and strings, collections or structures of simple types and objects, lambda expressions, expression trees, class instances, and/or class or type identifiers of various classes or objects. The representation may also include an indication of the circumstances under which an invocation occurred, e.g., a statefulness indicator of the computer system or an object (such as an interface object), or a timing descriptor that identifies the date and/or time of an invocation, which may be a standardized reference such as GMT, or relative to various reference points, such as other invocations or the system boot time. Alternatively, the instruction set may omit the timing information, and may be structured as a logical sequence for the invocations comprising the programming library usage (e.g., an indication of the sequential and/or concurrent invocation of various programming library methods.) Any combination of these and other descriptors may be stored within a captured representation of the programming library invocation(s) implemented in accordance with the techniques discussed herein.

A fourth aspect that may vary among implementations of the techniques presented herein relates to the instruction set generated to represent the programming library usage. Moreover, the scenarios described herein for using the techniques described herein may be more compatible with some generated instruction sets than others. As one example, the instruction set may be generated as a source code in a programming language. This exemplary variation may be advantageous in many scenarios, since the source code generated in this manner may be examined to inform the user of the performed usage of the programming library, modified to produce an altered instruction set with a different behavior, incorporated into other programs, transformed into an executable version that may be used to reproduce the programming library usage, etc. For instance, a system configured to implement these techniques may include an instruction set performing component, which may be configured to perform the instruction set. The instruction set performing component may comprise (e.g.) a compiler configured to produce a partially or wholly compiled executable binary from the programming language; a linker and/or loader for preparing such an executable binary for execution; a runtime, interpreter, virtual machine, etc. configured to facilitate the execution of the instruction set; etc.

As a second example, the instruction set may be generated as an executable binary, e.g., by first generating a source code in a programming language and then partially or wholly compiling the source code through a compiler for the programming language. The partially or wholly compiled binary may then be executed on a computer system that is compatible with such executable binaries in order to reproduce the programming library usage. This exemplary variation may be advantageous in a scenario where the user wishes to reproduce the behavior generated through a program. For instance, the user may employ a user interface to produce a desired behavior through the programming library, and may capture the generated behavior as an executable binary in order to reproduce the behavior on the computer system at a later time, or to perform the behavior on other computer systems. It may be appreciated that, due to the targeting of the capturing on the invocations of the programming library underlaying the user interface, the user may be able to produce such behaviors on various computer systems through the use of the executable binary without having to use the user interface through which the behavior was captured.

As a third example, the instruction set may be generated as an interpretable script, such that the usage may be reproduced by processing the interpretable script with an interpreter configured to process such scripts. For instance, the instruction set may be written in a shell script language that may be supported by the computer system, such that the interpretable script may be executed by a shell or command-line interpreter provided with the computer system. Alternatively, the instruction set may be written in an interpreted programming language, such as VBScript, which may be interpretively executed in various platforms, such as a web browser. As in the other exemplary variations of this aspect of these techniques, the instruction set generated in this manner may be examined by a user to inform various usages of the programming library, may be modified or executed, etc. Additionally, if the instruction set is generated as an interpretable script, it may be easier to structure the instruction set as a straightforward record or description of the programming library invocation generated through a user interface or another program. For instance, the instruction set may be formatted according to a hierarchical schema, such as a Document Type Definition (DTD) language like an XML variant, which may function both as an interpretable script and as a structured record of the sequence of methods invoked in a programming library. An instruction set formatted in this manner may be more easily processed to achieve various ends; e.g., the instruction set may be provided to a parser configured to read instruction sets of the selected format and to generate a source code in a desired programming language. For instance, a system configured to implement these techniques (such as the exemplary system 56 of FIG. 5) may include an instruction set translation component, which may be configured to translate the instruction set into a source code in a programming language.

Various other usages of instruction sets stored in these and other formats may be devised by those of ordinary skill in the art while implementing the techniques discussed herein.

A fifth aspect that may vary among implementations of the techniques presented herein relates to the use of the instruction set generated as set forth herein. According to the various types of instruction sets that may be generated, as discussed in the previous aspect, the instruction set may be analyzed or studied to inform various usages of the programming libraries; may be executed or interpreted; may be modified or incorporated into other programs, etc. Additionally, an instruction set generated according to these techniques may be used in other uses. As one example, an instruction set of one form may be transformed into a source code in programming language, such as by an instruction set translation component configured to perform such translations. This example may be directed toward an instruction set represented as an interpretable script, such as an XML document according to a well-defined schema. As another example, an instruction set represented as a source code may be partially or wholly compiled to produce an executable binary. Moreover, an executable binary produced by such techniques may be directly invoked by the user for execution. Alternatively or additionally, an executable binary may be associated with at least one system event upon which the instruction set is performed. This result may also achieved, e.g., by including in systems implementing these techniques (such as the exemplary system 56 of FIG. 5) an instruction set event registration component configured to associate the instruction set with at least one system event upon which the instruction set is performed. For instance, the programming library usage may be registered with the computer system as an association with a startup system event, such that the programming library usage may automatically be invoked by the computer system upon booting. Additional uses of instruction sets generated as set forth herein may be devised by those of ordinary skill in the art while implementing these techniques.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of informing a user of a programming library usage of at least one programming library by a first application invoked on a computer through a programming library user interface, the method comprising:
   detecting at least two invocations of the programming libraries invoked through the programming library user interface, the at least two invocations comprising a first invocation of a first programming library and a second invocation of a second programming library that is unrelated to the first programming library;
   generating an instruction set configured to represent the programming library usage, the instruction set reproducing at least one included invocation of the first programming library and the second programming library and excluding other invocations of a third programming library, and specifying a logical sequence of the first invocation and the second invocation, wherein the specifying includes an indication of the sequential and concurrent invocation of the first and the second programming library;

for respective invocations, recording in the instruction set a statefulness indicator indicating an internal state of the computer during the invocation and including at least one invocation of the programming library by a second application that is not within the call stack of the first application; and displaying the instruction set including the statefulness indicators to the user to inform the user of the programming library usage and the internal state of the computer including the at least one invocation of the programming library by the second application that is not within the call stack of the first application.

2. The method of claim 1, the generating comprising generating the instruction set reproducing the programming library usages generated by a user through the programming library user interface and excluding other invocations of the programming library not generated by the user.

3. The method of claim 2, the programming library user interface comprising at least one of a graphical user interface and a command-line interface.

4. The method of claim 1, the programming library usage initiated through the programming library user interface by a second program without interaction from the user.

5. The method of claim 4, the programming library usage comprising: capturing the programming library usage comprising only invocations of the programming library invoked through the programming library user interface by a specified program and excluding invocations of the programming library user interface by other programs.

6. The method of claim 4, generating the instruction set representing the programming library usage comprising: generating the instruction set reproducing only the at least one invocation of the programming library invoked through the programming library user interface by the second program and excluding invocations of the programming library invoked through the programming library user interface not by the second program.

7. The method of claim 1, generating the instruction set representing the programming library usage comprising: generating the instruction set reproducing only the at least one invocation of a specified programming library and excluding invocations of other programming libraries.

8. The method of claim 7, generating the instruction set representing the programming library usage comprising: generating the instruction set reproducing only the at least one invocation of a specified programming library version of the specified programming library and excluding invocations of other programming library versions of the specified programming library.

9. The method of claim 1, the statefulness indicator identifying a thread that invoked the invocation of the programming library.

10. The method of claim 1:
the programming library accessible within a virtual machine; and
detecting the programming library usage comprising: configuring the virtual machine to detect invocations of the programming library.

11. The method of claim 1, detecting the programming library usage comprising: configuring an instruction point monitor to detect invocations of the programming library.

12. The method of claim 1:
respective programming libraries comprising a programming library type; and generating the instruction set representing the programming library usage comprising: generating the instruction set reproducing only the at least one invocation of programming libraries of a selected programming library type and excluding invocations of programming libraries of other programming library types.

13. The method of claim 1, generating the instruction set representing the programming library usage comprising: generating the instruction set reproducing only the at least one invocation of the programming library by a specified thread associated with the programming library user interface and excluding invocations of the programming library by other threads associated with the programming library user interface.

14. The method of claim 1, generating the instruction set representing the programming library usage comprising: generating the instruction set reproducing only the at least one invocation of the programming library through a selected interface object associated with the graphical user interface and excluding invocations of the programming library through other interface objects associated with the graphical user interface.

15. A computer-readable memory device storing instructions that, when executed on a processor of a computer having at least one programming library accessible through a programming library user interface, inform a user of a programming library usage of the programming library invoked by a first application through the programming library user interface by:

detecting at least two invocations of the programming libraries invoked through the programming library user interface, the at least two invocations comprising a first invocation of a first programming library and a second invocation of a second programming library that is unrelated to the first programming library;

generating an instruction set configured to represent the programming library usage, the instruction set reproducing at least one included invocation of the first programming library and the second programming library and excluding other invocations of a third programming library, and specifying a logical sequence of the first invocation and the second invocation, wherein the specifying includes an indication of the sequential and concurrent invocation of the first and the second programming library;

for respective invocations, recording in the instruction set a statefulness indicator indicating an internal state of the computer during the invocation and including at least one invocation of the programming library by a second application that is not within the call stack of the first application; and displaying the instruction set including the statefulness indicators to the user to inform the user of the programming library usage and the internal state of the computer including the at least one invocation of the programming library by the second application that is not within the call stack of the first application.

16. A method of facilitating a user performing an experimental usage of at least one programming library invoked by a first application through a programming library user interface of a computer, the method comprising:

during the experimental usage, detecting at least two invocations of at least one programming library invoked through the programming library user interface, the at least two invocations comprising a first invocation of a first programming library and a second invocation of a second programming library that is unrelated to the first programming library;

generating an instruction set configured to represent the experimental usage, the instruction set reproducing at least one included invocation of the first programming library and the second programming library and excluding other invocations of a third programming library, and specifying a logical sequence of the first invocation and the second invocation, wherein the specifying includes an indication of the sequential and concurrent invocation of the first and the second programming library;

for respective invocations, recording in the instruction set a statefulness indicator indicating an internal state of the computer during the invocation;

displaying the instruction set including the statefulness indicators to the user to inform the user of the programming library usage and the internal state of the computer and including at least one invocation of the programming library by a second application that is not within the call stack of the first application; and upon receiving a request from the user to reverse the experimental usage of the programming library after completion of the experimental usage, reversing the experimental usage represented by the instruction set including the at least one invocation of the programming library by the second application that is not within the call stack of the first application.

17. The method of claim 16, the detecting comprising detecting the programming library usage generated by a user through the programming library user interface.

18. The method of claim 16, the programming library user interface comprising at least one of a graphical user interface and a command-line interface.

19. The method of claim 16, generating the instruction set representing the programming library usage comprising: generating the instruction set reproducing only the at least one invocation of a specified programming library and excluding invocations of other programming libraries.

* * * * *